(12) United States Patent
Aikawa et al.

(10) Patent No.: US 12,109,974 B2
(45) Date of Patent: Oct. 8, 2024

(54) PEDESTRIAN PROTECTION DEVICE

(71) Applicant: TOYODA GOSEI CO., LTD., Kiyosu (JP)

(72) Inventors: Kunihiro Aikawa, Kiyosu (JP); Hiroki Sakamoto, Kiyosu (JP); Atsushi Kashio, Kiyosu (JP); Makoto Ozeki, Kiyosu (JP); Ken Nitayama, Nagoya (JP); Yusuke Ayukawa, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/536,866

(22) Filed: Dec. 12, 2023

(65) Prior Publication Data

US 2024/0239299 A1    Jul. 18, 2024

(30) Foreign Application Priority Data

Jan. 17, 2023   (JP) ................................ 2023-005488

(51) Int. Cl.
*B60R 21/36*      (2011.01)
*B60R 21/20*      (2011.01)
*B60R 21/231*     (2011.01)

(52) U.S. Cl.
CPC .............. *B60R 21/36* (2013.01); *B60R 21/20* (2013.01); *B60R 21/231* (2013.01)

(58) Field of Classification Search
CPC .......................... B60R 21/36; B60R 2021/346
See application file for complete search history.

(56) References Cited

U.S. PATENT DOCUMENTS

| 2007/0114090 A1* | 5/2007 | Okamoto ................ B60R 21/36 |
| | | 180/274 |
| 2019/0092272 A1 | 3/2019 | Funahashi et al. |

FOREIGN PATENT DOCUMENTS

| DE | 102018118186 A1 * | 1/2019 | .......... B60R 21/231 |
| EP | 1475276 A1 * | 11/2004 | .......... B60R 21/233 |
| JP | 2006044291 A * | 2/2006 | |
| JP | 2017-177986 A | 10/2017 | |
| JP | 2017177967 A * | 10/2017 | |
| JP | 2019151203 A * | 9/2019 | |
| JP | 2021054253 A * | 4/2021 | |
| WO | WO-2007099912 A1 * | 9/2007 | ......... B60R 21/2338 |
| WO | WO-2017141857 A1 * | 8/2017 | .......... B60R 21/231 |

* cited by examiner

*Primary Examiner* — Nicole T Verley
(74) *Attorney, Agent, or Firm* — Posz Law Group, PLC

(57) ABSTRACT

A pedestrian protection device includes a left airbag and a right airbag that are disposed in a vicinity of a rear end of a hood panel in a vehicle, and are arranged in parallel on vehicle width direction sides. The left airbag and the right airbag each include a cowl cover portion that is disposed following the vehicle width direction and covers an upper face side of a cowl. The cowl cover portions have end portion regions disposed coinciding with each other on up-down direction sides on end sides that are in proximity to each other. At least one of the end portion regions is configured in such a way that an internal pressure when inflation is completed is raised higher than that of a general region.

5 Claims, 13 Drawing Sheets

← RIGHTWARD    LEFTWARD →

PEDESTRIAN PROTECTION DEVICE

CROSS REFERENCE TO RELATED APPLICATIONS

The present application claims priority from Japanese Patent Application No. 2023-5488 of Aikawa et al., filed on Jan. 17, 2023, the entire disclosures of which are incorporated herein by reference.

BACKGROUND

1. Technical Field

The present disclosure relates to a pedestrian protection device disposed in a vicinity of a rear end of a hood panel in a vehicle.

2. Description of Related Art

A device of a configuration shown in JP2017-177986A is already known as a pedestrian protection device disposed in a vicinity of a rear end of a hood panel of a vehicle. The existing pedestrian protection device is such that a mounting space in a vehicle is divided into left and right in order to achieve compactness, and the device includes a left airbag and a right airbag that are arranged in parallel on vehicle width direction sides when inflation is completed. The existing pedestrian protection device is such that each of the left airbag and the right airbag has a cowl cover portion that is disposed in such a way as to approximately follow the vehicle width direction when inflation is completed, and covers a cowl from above. The left airbag and the right airbag expand in such a way that ends on sides in proximity to each other in the two cowl cover portions coincide with each other, thereby covering the cowl from above over approximately a whole length.

However, the existing pedestrian protection device is such that the ends of the cowl cover portions in the left airbag and the right airbag are simply disposed in such a way as to coincide vertically when inflation is completed. This means that in order that a protective performance of a region in which the ends coincide with each other is a protective performance approximately equivalent to that of a general region of the cowl portions excepting the ends, it is necessary that an amount of the coinciding (overlapping) of two end regions is set to be large. That is, the existing pedestrian protection device is such that the ends of the cowl cover portions need to be caused to coincide (overlap) by a large amount when inflation of each of the left airbag and the right airbag is completed. Because of this, there is room for improvement in terms of restricting an increase in a capacity of the left airbag or the right airbag (a capacity of a case in which the folded left airbag or right airbag is housed), thereby achieving compactness.

SUMMARY

A pedestrian protection device of the present disclosure includes:
- a left airbag and a right airbag that are disposed in a vicinity of a rear end of a hood panel in a vehicle, and are arranged in parallel on vehicle width direction sides when inflation of each is completed, wherein
- the left airbag includes a left cowl cover portion that is disposed approximately following the vehicle width direction and covers an upper face side of a cowl when inflation is completed, and
- the right airbag includes a right cowl cover portion that is disposed approximately following the vehicle width direction and covers the upper face side of the cowl when inflation is completed, and wherein
- the left cowl cover portion and the right cowl cover portion are configured to have end portion regions disposed coinciding with each other on up-down direction sides on end sides that are in proximity to each other when inflation is completed, and
- at least one of the end portion regions is configured in such a way that an internal pressure when inflation is completed is raised higher than that of a general region of the left airbag or the right airbag.

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
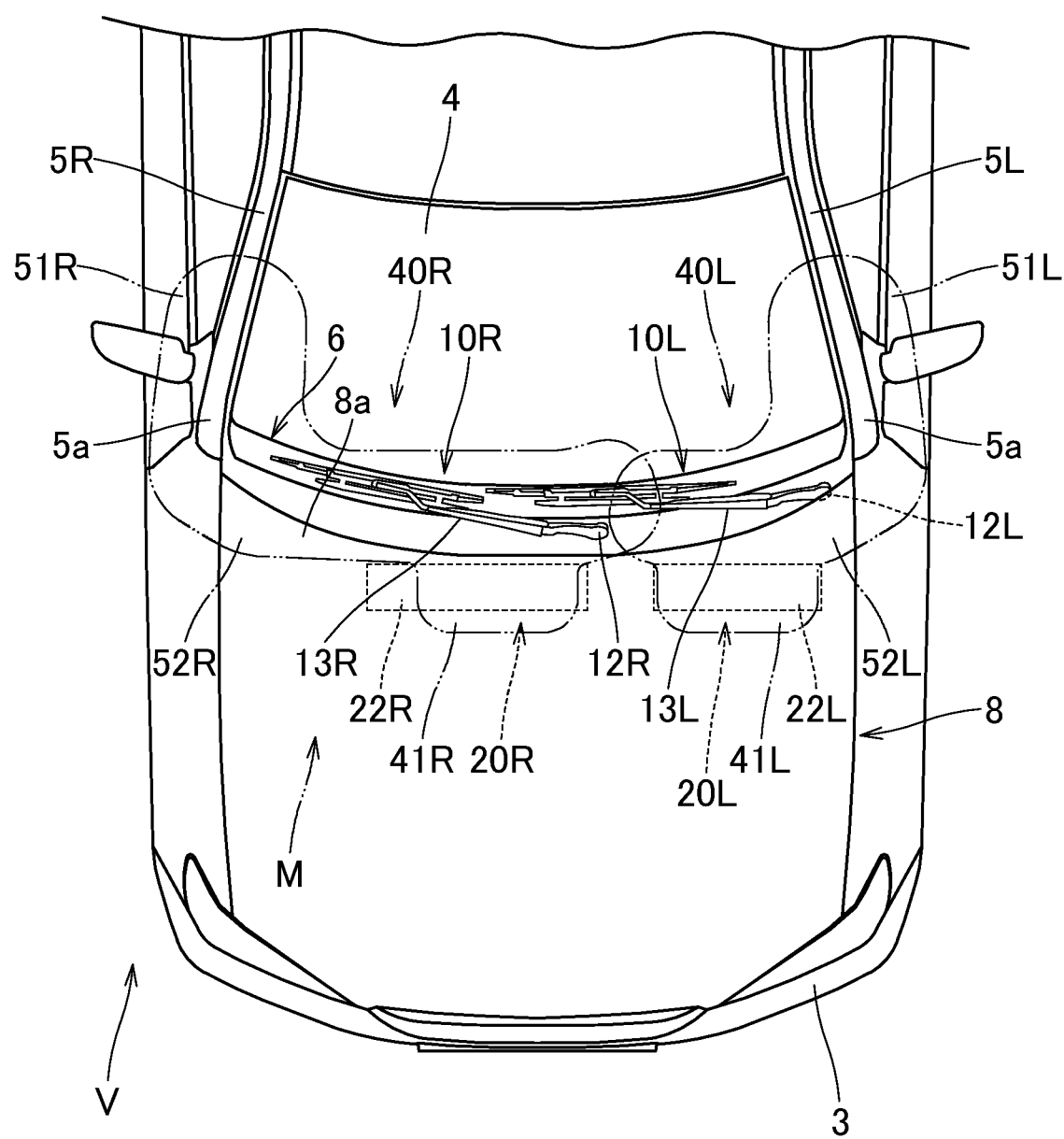
FIG. 1 is a plan view of a vehicle in which a pedestrian protection device that is one embodiment of the present disclosure is mounted.

Hereafter, an embodiment of the present disclosure will be described based on the drawings. A pedestrian protection device M of the embodiment is mounted in a vehicle V, which is a so-called left-hand drive vehicle wherein a driver's seat is disposed on a left side, as shown in FIG. 1. Specifically, the pedestrian protection device M includes two airbag devices 20L and 20R. As shown in FIG. 1, a left and right pair of wipers 10L and 10R are disposed in the vehicle V below a rear end 8a side of a hood panel 8, and in the case of the embodiment, in a region of a cowl 6. In the embodiment, the two airbag devices 20L and 20R are disposed one each on left and right sides either side of a wiper pivot 12R, to be described hereafter, of the wiper 10R, which is disposed on a right side (a passenger seat side). In the present specification, unless particularly stated otherwise, front-rear, up-down, and left-right directions are described as coinciding with front-rear, up-down, and left-right directions respectively of the vehicle V.

The cowl 6 is configured of a cowl panel 6a of high rigidity on a body side, and a cowl louver 6b made of a synthetic resin above the cowl panel 6a.

Figure 2:
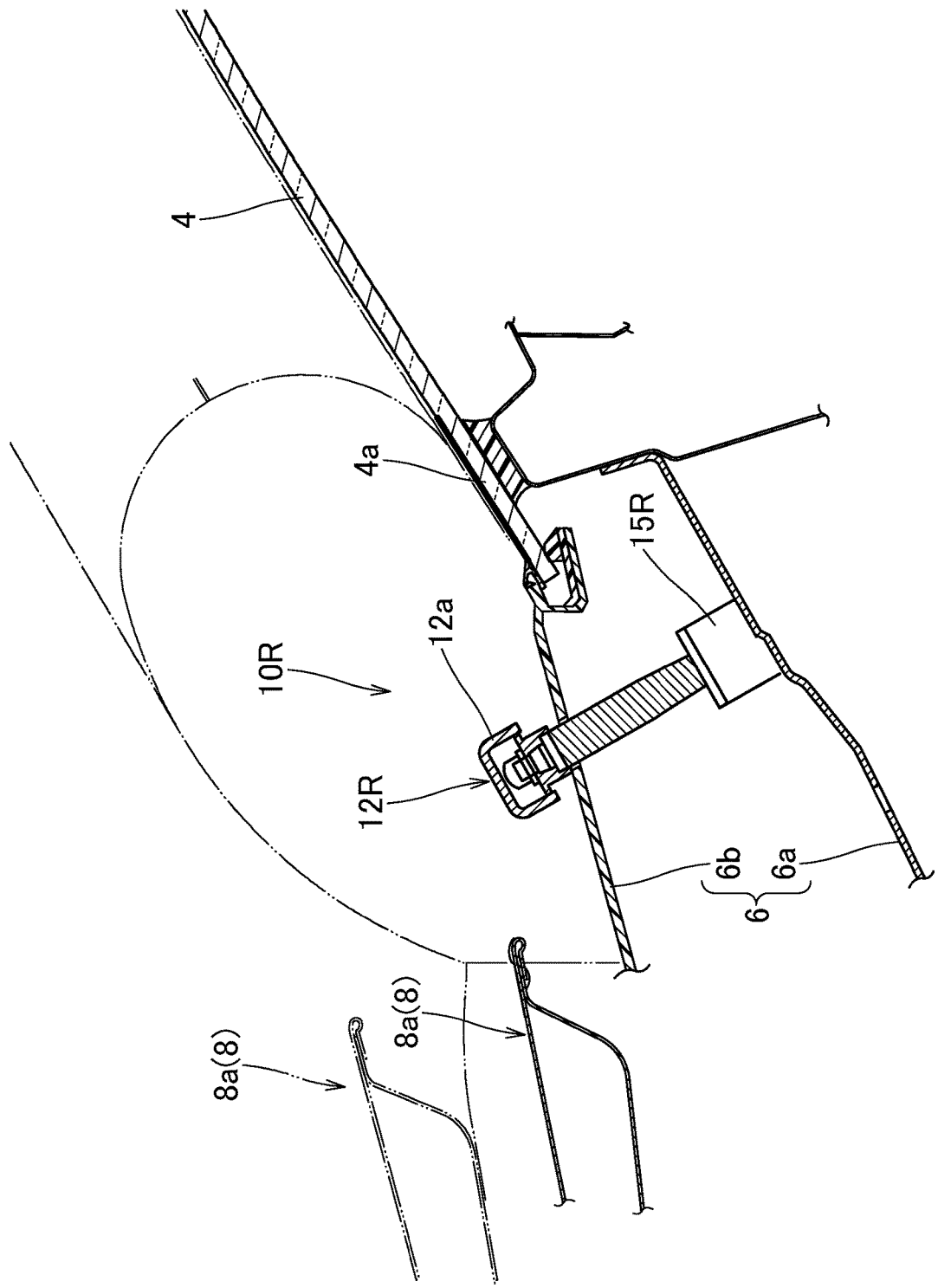
FIG. 2 is a schematic vertical sectional view showing a wiper pivot in the vehicle of FIG. 1.

The wipers 10L and 10R are a left and right pair. As shown in FIGS. 1 and 2, the wipers 10L and 10R include, respectively, wiper main bodies 11L and 11R which are disposed on an upper side of the cowl louver 6b, and drive mechanisms 15L and 15R which are disposed below the cowl louver 6b and drive the wiper main bodies 11L and 11R. The wiper main bodies 11L and 11R include wiper pivots 12L and 12R which are coupled to the drive mechanisms 15L and 15R, and elongated arm portions 13L and 13R. Base portion sides of the arm portions 13L and 13R are coupled to the wiper pivots 12L and 12R in such a way as to be able to pivot freely. Specifically, the arm portions 13L and 13R are coupled to upper end 12a sides of the wiper pivots 12L and 12R. As shown in FIG. 2, the upper ends 12a of the wiper pivots 12L and 12R protrude above the cowl louver 6b. Further, in the case of the embodiment, the wiper pivot 12R of the wiper 10R disposed on the right side (the passenger seat side) is disposed centrally in a vehicle width direction (the left-right direction). Specifically, the wiper pivot 12R of the wiper 10R on the right side is disposed in a position slightly to the left of center in the vehicle width direction (the left-right direction) of the cowl 6 (refer to FIG. 1).

Each of the two airbag devices 20L and 20R is disposed in a position that is below a vicinity of the rear end 8a of the hood panel 8. Specifically, the airbag devices 20L and 20R are disposed neighboring in positions on a front side of the cowl louver 6b (refer to FIG. 3). Specifically, as shown in FIG. 1, the left airbag device 20L disposed on the left side (the driver's seat side) is disposed in a region between the wiper pivots 12L and 12R of the wipers 10L and 10R respectively. The right airbag device 20R disposed on the right side (the passenger seat side) is disposed in a position that is to the right of the wiper pivot 12R of the wiper 10R on the right side. The left airbag device 20L and the right airbag device 20R are of the same configuration except that forms of the left airbag 40L and the right airbag 40R when inflation is completed differ slightly, and sizes of the actual devices (sizes of cases 22L and 22R, to be described hereafter, or more specifically, width dimensions between left-right direction sides of the cases 22L and 22R, refer to FIG. 1) are slightly different. Because of this, a description will be given by adding L or R after identical reference signs. In the embodiment, a description will be given taking mainly the right airbag device 20R disposed on the right side (the passenger seat side) as an example. In the embodiment, the rear end 8a side of the hood panel 8 is lifted upward by an unshown actuator when the left airbag device 20L and the right airbag device 20R operate (refer to FIGS. 2 and 3).

The right airbag device 20R includes the right airbag 40R, an inflator 28R that supplies an inflating gas to the right airbag 40R, the case 22R as a housing region that houses the folded right airbag 40R and the inflator 28R, and an airbag cover 26R that covers the folded right airbag 40R.

The case 22R is made of metal (made of sheet metal), and is fixed to an attachment portion 2R configured of a flange or the like that extends from the cowl panel 6a on a body 1 side of the vehicle V. Specifically, the case 22R is fixed to the attachment portion 2R by utilizing a bolt 32R of an attachment bracket 31R of the inflator 28R and a nut 33R (refer to FIG. 3). The case 22R is of an approximately cuboid box form that has, on an upper end side, a protrusion aperture 22a for causing the right airbag 40R to protrude when expanding. The case 22R includes a bottom wall portion 23R of an approximately rectangular plate form, which extends approximately following the left-right direction (the vehicle width direction) of the vehicle V, and a peripheral wall portion 24R of an approximately rectangular tube form, which extends upward from an outer peripheral edge of the bottom wall portion 23R. The case 22R is disposed on a front end side of the cowl 6 below the rear end 8a of the hood panel 8. More specifically, the case 22R is disposed in a position that is farther forward than the wiper pivot 12R, and in proximity to the wiper pivot 12R on the right side (refer to FIG. 1). Also, as shown in FIG. 3, the arm portion 13R of the wiper 10R on the right side is disposed in a region of the cowl 6 on the rear side of the case 22R.

The airbag cover 26R covers the protrusion aperture 22a of the case 22R. The airbag cover 26R is approximately flush with the cowl louver 6b, and is disposed in such a way as to extend forward from the cowl louver 6b. The airbag cover 26R is attached to a front side of the peripheral wall portion 24R of the case 22R. When the right airbag 40R housed in the case 22R expands, the airbag cover 26R is pushed open by the right airbag 40R.

Figure 3:
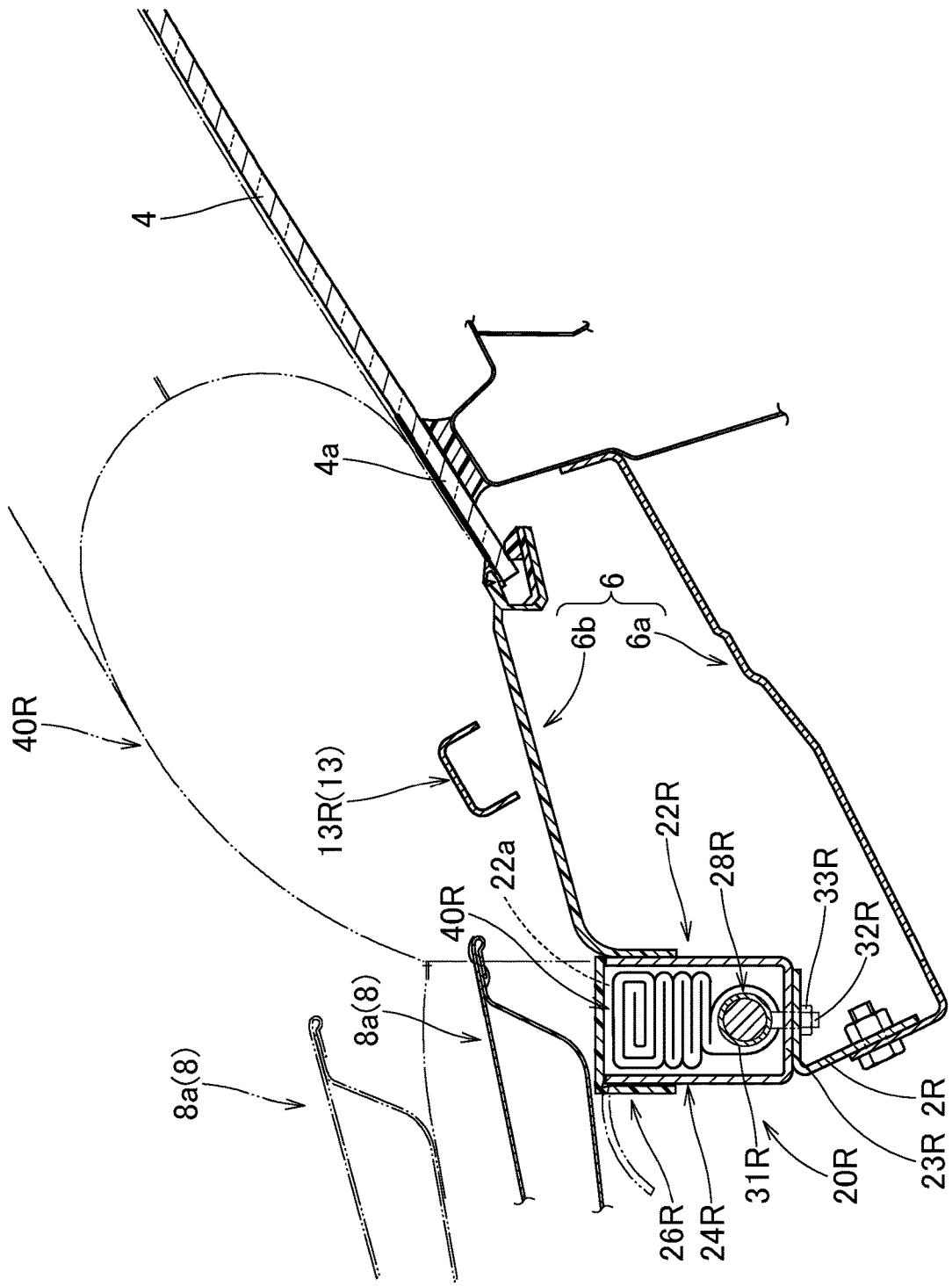
FIG. 3 is a schematic vertical sectional view showing a right airbag device in the pedestrian protection device of the embodiment.
Figure 5:
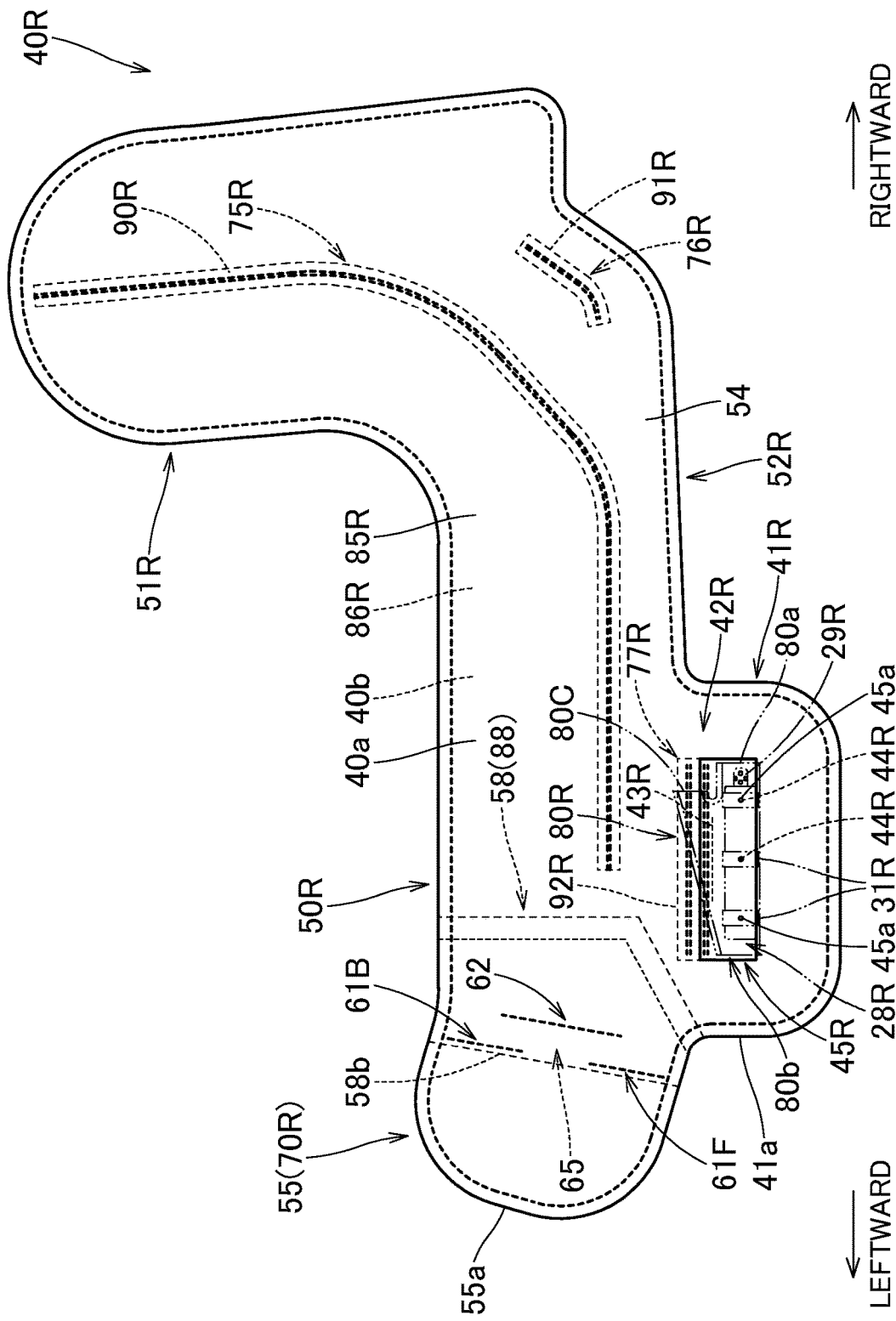
FIG. 5 is a bottom view of the right airbag of FIG. 4.

As shown in FIG. 3, and as indicated by two-dot chain lines in FIG. 5, the inflator 28R is of an approximately cylindrical form disposed in such a way that an axial direction approximately follows the left-right direction (the vehicle width direction) of the vehicle V. A gas discharging portion 29R that discharges inflating gas is disposed on a leading end side (in the case of the embodiment, a right end side) of the inflator 28R. In the case of the embodiment, the inflator 28R is held in a multiple (three in the case of the embodiment) of the attachment bracket 31R, and is inserted into the right airbag 40R in a state wherein a periphery is enveloped in an inner tube 80R. Further, the inflator 28R is fixed to the bottom wall portion 23R of the case 22R by utilizing the bolts 32R of the attachment brackets 31R (refer to FIG. 3). As heretofore described, each of the bolts 32R of the attachment brackets 31R penetrates the bottom wall portion 23R, and is fastened to the attachment portion 2R on the body 1 side of the vehicle V using the nut 33R. That is, each of the bolts 32R of the attachment brackets 31R fixes the case 22R to the attachment portion 2R together with the inflator 28R (refer to FIG. 3). Also, when attaching to the attachment portion 2R of the attachment brackets 31R, the right airbag 40R is also attached and fixed to the bottom wall portion 23R of the case 22R. This is because the inflator 28R is in a state inserted into the right airbag 40R. The inflator 28R is configured in such a way as to operate when a collision between the vehicle V and a pedestrian is detected by an unshown sensor provided in a front bumper 3 of the vehicle V.

The right airbag 40R and the left airbag 40L are configured in such a way that length dimensions of a left cowl cover portion 52L and a right cowl cover portion 52R to be described hereafter, and disposition of case side regions 41L and 41R to be described hereafter, with respect to the cowl cover portions 52L and 52R, differ slightly. Also, the right airbag 40R and the left airbag 40L are such that configurations of regions central in the vehicle width direction of the cowl cover portions 52L and 52R differ. In regions other than this, however, the left airbag 40L and the right airbag 40R are such that basic configurations are approximately the same, simply being disposed in such a way as to have bilateral symmetry (refer to FIGS. 4 and 9). Because of this, L or R will be added after identical reference signs for members in the left airbag 40L and the right airbag 40R other than regions central in the vehicle width direction of the cowl cover portions 52L and 52R, and a description will be omitted as appropriate.

Figure 4:
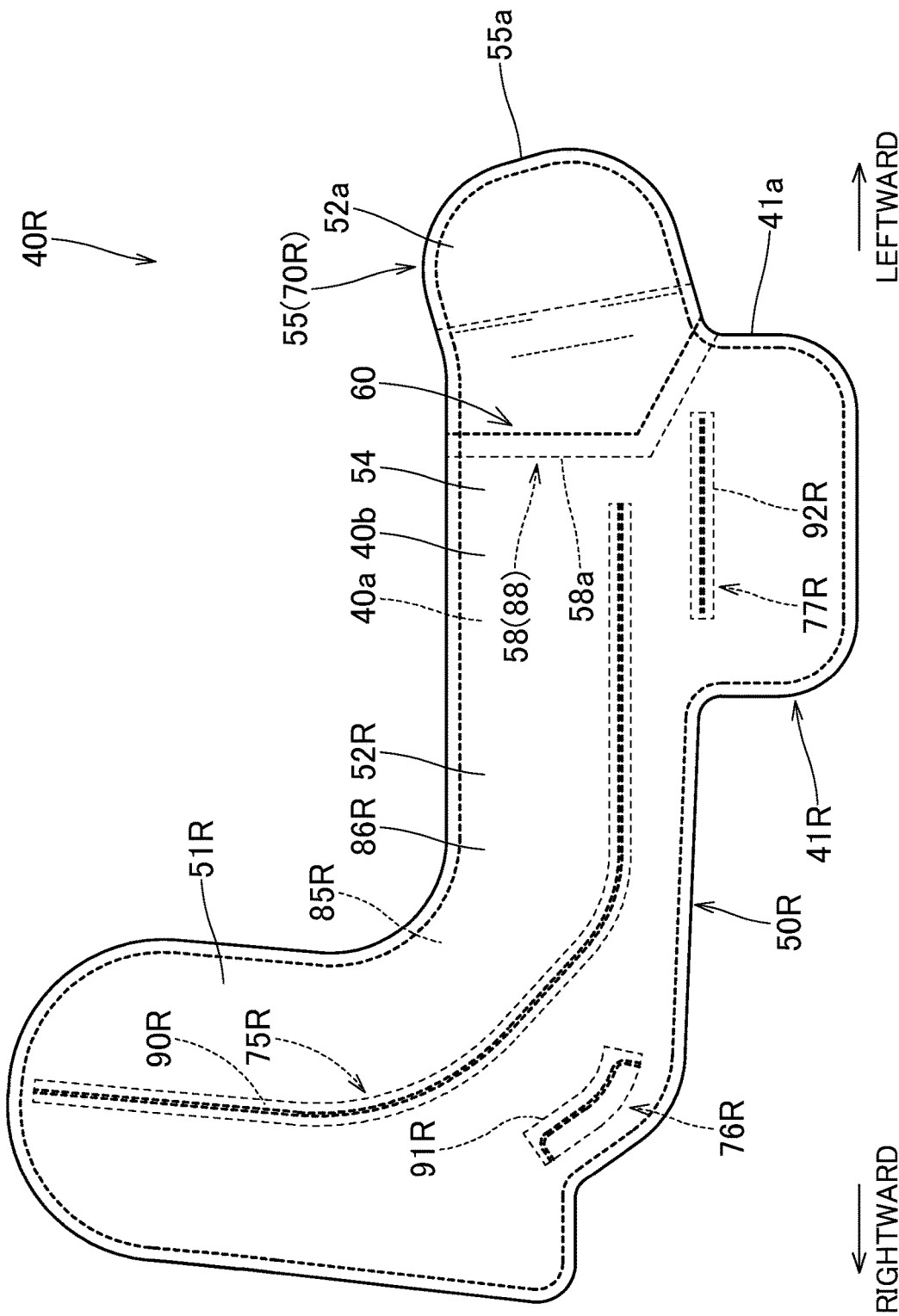
FIG. 4 is a plan view of a right airbag used in a right airbag device in a flattened state.

As shown in FIGS. 4 and 5, the right airbag 40R includes the case side region 41R and a main body expanding portion 50R. The case side region 41R is a region disposed from the case 22R side to a lower face side of the rear end 8*a* of the hood panel 8 when inflation of the right airbag 40R is completed. The main body expanding portion 50R is a region disposed in such a way as to extend rearward from the case 22R when inflation of the right airbag 40R is completed. Also, the right airbag 40R has a vehicle body side wall portion 40*a* which is disposed on the body 1 side when inflation is completed, and a pedestrian side wall portion 40*b* disposed opposing the vehicle body side wall portion 40*a*. External forms of the vehicle body side wall portion 40*a* and the pedestrian side wall portion 40*b* are approximately the same. Further, the right airbag 40R is formed in a bag form by outer peripheral edges of the vehicle body side wall portion 40*a* and the pedestrian side wall portion 40*b* being joined (sewn) to each other over a whole periphery.

The case side region 41R is formed in such a way as to extend forward from the right cowl cover portion 52R, to be described hereafter, of the main body expanding portion 50R. The case side region 41R is attached to the case 22R on a rear end side region (the main body expanding portion 50R side) when inflation is completed. Further, the case side region 41R is of a configuration such as to cover from above a region on a forward side from directly above the case 22R, that is, a vicinity of the rear end 8*a* of the hood panel 8 from below, when inflation is completed (refer to FIGS. 11 and 12). The case side region 41R is configured to be of a smaller width (a left-right direction width dimension is set to be smaller) than the right cowl cover portion 52R of the main body expanding portion 50R. That is, the case side region 41R is formed in such a way as to partially protrude forward from the right cowl cover portion 52R. A width dimension between left-right direction sides (vehicle width direction sides) of the case side region 41R is set to be slightly smaller than a width dimension between left-right direction sides of the case 22R (refer to FIGS. 1 and 11). An insertion aperture portion 42R for inserting the inflator 28R into an interior is formed in a region configuring a rear end side of the case side region 41R in the vehicle body side wall portion 40*a* (refer to FIG. 5). The insertion aperture portion 42R includes an insertion slit 43R, three insertion holes 44R, and a cover panel 45R that blocks off the insertion slit 43R from an outer peripheral side. The insertion slit 43R is a region for inserting the inflator 28R, in a state wherein the outer peripheral side is enveloped in the inner tube 80R, into the right airbag 40R. The insertion slit 43R is formed in an approximately linear form approximately following the left-right direction. Each of the insertion holes 44R is a region for inserting the bolt 32R of the attachment bracket 31R. The insertion holes 44R are formed in a region farther to the front side than the insertion slit 43R (refer to FIGS. 5 and 8). The cover panel 45R covers an outer surface side of the insertion slit 43R. A rear edge side of the cover panel 45R is joined to the vehicle body side wall portion 40*a* on a rear side of the insertion slit 43R. Three attachment holes 45*a* for causing the bolts 32R of the attachment brackets 31R to protrude are formed on a front end side of the cover panel 45R. These attachment holes 45*a* are formed corresponding to the insertion holes 44R (refer to FIGS. 5 and 8).

An external form of the main body expanding portion 50R when inflation is completed is an approximate L form as seen from the front side. The main body expanding portion 50R includes the right cowl cover portion 52R and a pillar cover portion 51R. The right cowl cover portion 52R is a region disposed approximately following the left-right direction (the vehicle width direction) in such a way as to approximately follow a lower portion 4*a* of a front windshield 4. The pillar cover portion 51R is a region that extends rearward from an end portion (a right end) on a vehicle width direction outer side of the right cowl cover portion 52R, and covers a lower portion 5*a* side of a front face of a front pillar 5R on the right side. In the case of the embodiment, the pillar cover portion 51R is wider than the right cowl cover portion 52R in a state wherein the right airbag 40R is flattened. Further, the pillar cover portion 51R is configured in such a way as to be able to extensively cover the lower portion 5*a* side of the front face of the front pillar 5R on the right side (refer to FIGS. 4, 5, and 11).

The right cowl cover portion 52R is configured in such a way as to cover an upper face side (a front face side) from the cowl 6 to the lower portion 4*a* side of the front windshield 4 when inflation of the right airbag 40R is completed. Specifically, when inflation of the right airbag 40R is completed, the right cowl cover portion 52R covers a region from a right end of the cowl 6 to a region on the left of the wiper pivot 12R of the wiper 10R on the right side (refer to FIG. 11). Specifically, the right cowl cover portion 52R has a region that extends farther to the left than the case side region 41R. The right cowl cover portion 52R is such that a left end side region 55 positioned farther to the left than the case side region 41R inclines slightly with respect to the left-right direction (the vehicle width direction) in such a way that an end edge 55*a* side is oriented rearward in a state wherein the right airbag 40R is flattened (refer to FIG. 4). Also, in the embodiment, the left end side region 55 of the right cowl cover portion 52R is partitioned off from a remaining right-side region (a general expanding portion 54) by a partitioning wall 58 disposed in an interior. Owing to the partitioning wall 58, the left end side region 55 is of a configuration such that an internal pressure when inflation is completed is raised.

Figure 6A:
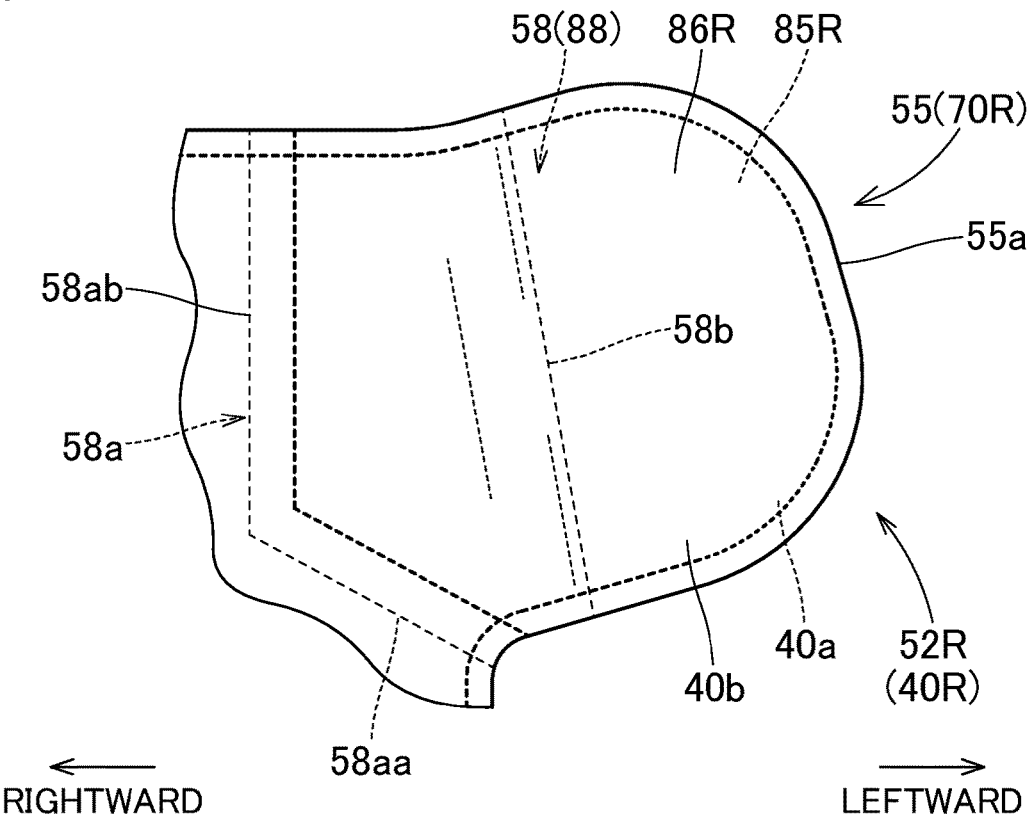
FIG. 6A is a partial enlarged plan view showing a left end side region of a right cowl cover portion in the right airbag of FIG. 4.
Figure 6B:
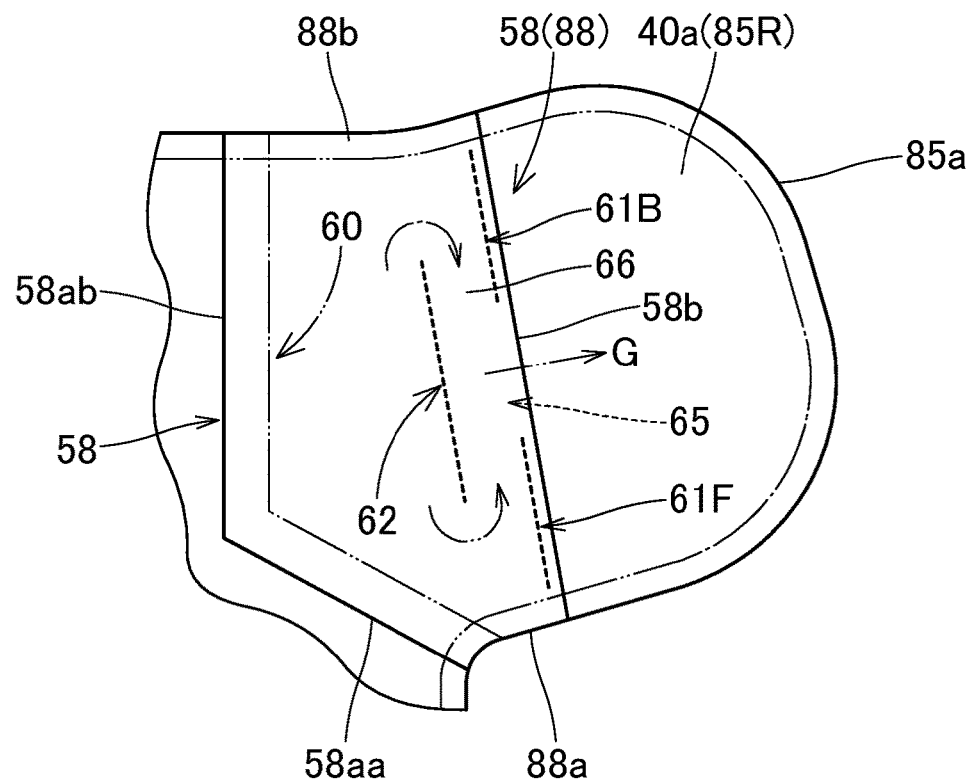
FIG. 6B is a partial enlarged plan view of a state wherein a vehicle body side wall portion and a partitioning wall are coincided in the left end side region.
Figure 7A:
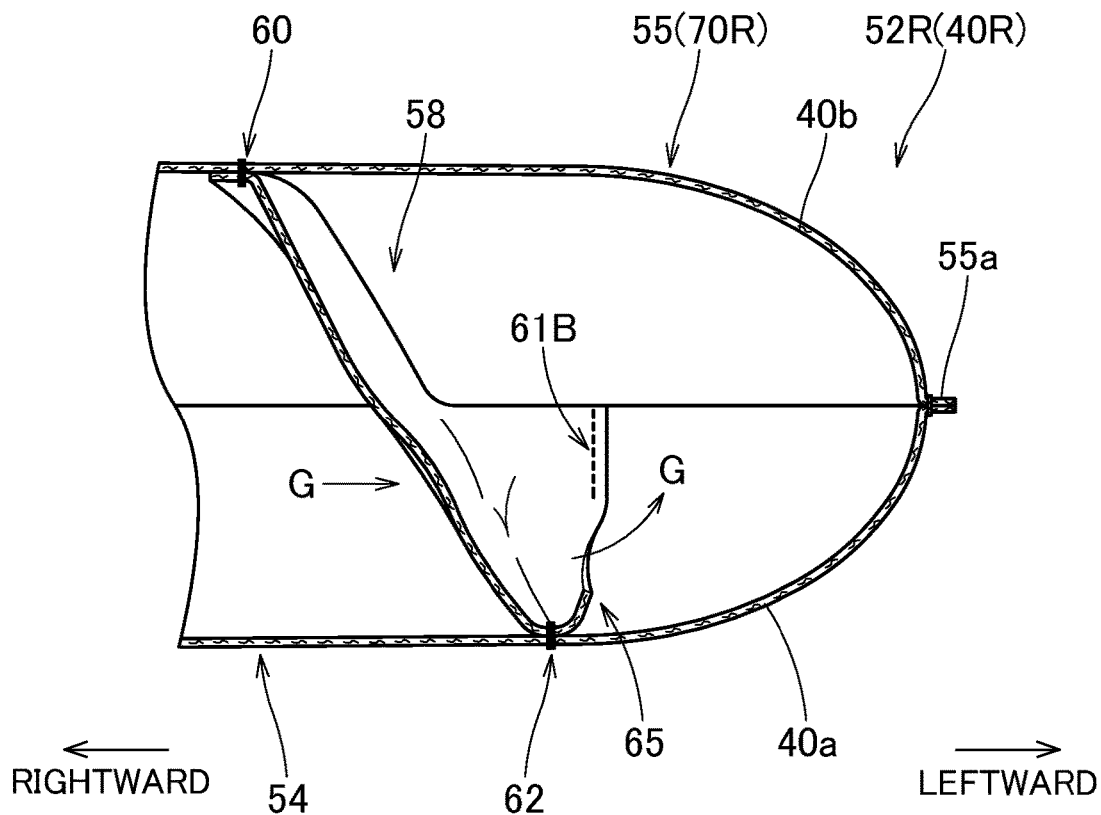
FIG. 7A is a schematic partial enlarged sectional view showing a state partway through inflation of the left end side region in the right airbag of FIG. 4.
Figure 7B:
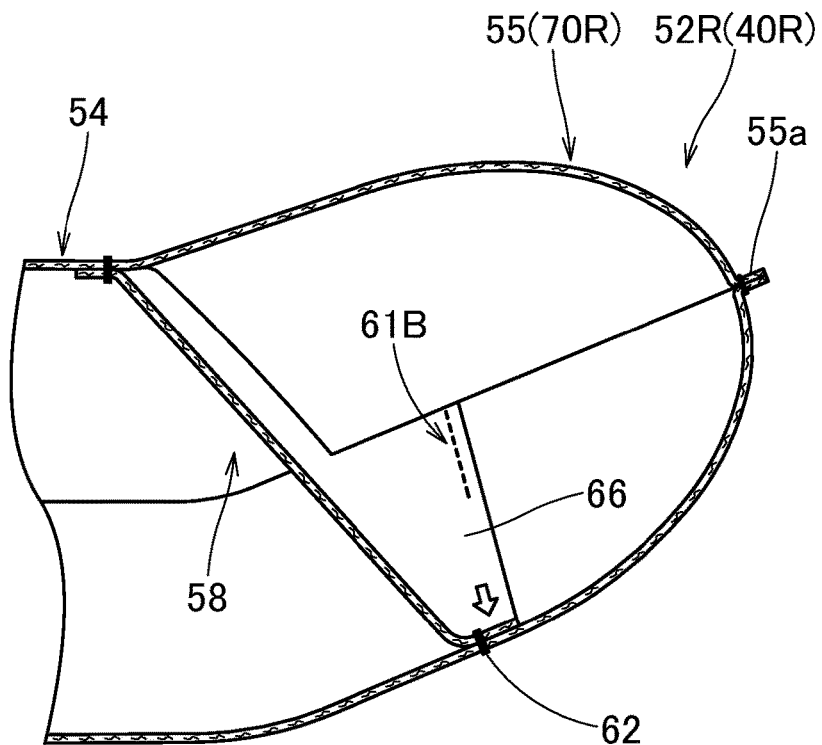
FIG. 7B is a schematic partial enlarged sectional view showing a state wherein inflation of the left end side region is completed.

Specifically, as shown in FIGS. 4 to 6A, the partitioning wall 58 disposed in the right cowl cover portion 52R is disposed in a vicinity of a region of a boundary with the left end 41*a* side of the case side region 41R. An outer peripheral edge of the partitioning wall 58 is joined to the right airbag 40R sides (the vehicle body side wall portion 40*a* and the pedestrian side wall portion 40*b*) over approximately a whole periphery, excepting one portion of a left edge 58*b* side linked to the vehicle body side wall portion 40*a*. In this way, the partitioning wall 58 separates the left end side region 55 and the general expanding portion 54 (a general region). Also, the partitioning wall 58 includes an outflow aperture portion 65 and a reverse flow restricting portion 66. The outflow aperture portion 65 is of a configuration such that an inflating gas G that has flowed into the general expanding portion 54 can flow out to the left end side region 55 side. The reverse flow restricting portion 66 is of a configuration such that a reverse flow of inflating gas that has flowed into the left end side region 55 via the outflow aperture portion 65 can be restricted. Specifically, as shown in FIGS. 6B, 7A and 7B, the outflow aperture portion 65 is formed from gaps between joint regions (lower outer side partial joint portions 61F and 61B and a lower inner side partial joint portion 62) wherein the left edge 58b side of the partitioning wall 58 is intermittently sewn (joined) to the vehicle body side wall portion 40a. The reverse flow restricting portion 66 is formed from a region that configures a periphery of the joint regions (the lower outer side partial joint portions 61F and 61B and the lower inner side partial joint portion 62) of the partitioning wall 58.

In the case of the embodiment, in a state wherein the right airbag 40R is flattened, the partitioning wall 58 is disposed in a vicinity of the rear of the left end 41a side of the case side region 41R in a region of the right cowl cover portion 52R, as shown in FIGS. 4 to 6A. The partitioning wall 58 is configured of a partitioning wall panel 88 such as that shown in FIG. 8. A front edge 88a of the partitioning wall panel 88 is of a form such as to approximately follow outer peripheral edges 85a and 86a of the vehicle body side wall portion 40a (a vehicle body side panel 85R to be described hereafter) and the pedestrian side wall portion 40b (a pedestrian side panel 86R to be described hereafter). A rear edge 88b of the partitioning wall panel 88 is also of a form such as to approximately follow the outer peripheral edges 85a and 86a of the vehicle body side wall portion 40a (the vehicle body side panel 85R) and the pedestrian side wall portion 40b (the pedestrian side panel 86R). Further, each of the front edge 88a and the rear edge 88b of the partitioning wall panel 88 is joined (sewn) over a whole length together with the outer peripheral edges 85a and 86a of the vehicle body side wall portion 40a (the vehicle body side panel 85R) and the pedestrian side wall portion 40b (the pedestrian side panel 86R) (refer to FIGS. 6A and 6B). A right edge 58a of the partitioning wall panel 88 (the partitioning wall 58) is formed curved (bent) in a state wherein the right airbag 40R is flattened (refer to FIGS. 6A and 6B). Specifically, the right edge 58a has a rear side region 58ab, which approximately follows the front-rear direction, and a front side region 58aa inclined in such a way that a front end is oriented leftward. The right edge 58a is joined (sewn) over a whole length to the pedestrian side wall portion 40b (the pedestrian side panel 86R) (refer to FIG. 6A). The right edge 58a is joined (sewn) to the pedestrian side wall portion 40b (the pedestrian side panel 86R) by an upper side joint region 60. The rear side region 58ab of the right edge 58a is disposed in a position farther to the right than the left end 41a of the case side region 41R in a state wherein the right airbag 40R is flattened. Specifically, the rear side region 58ab is disposed in a position that forms in the region of one-third of the left side of the case side region 41R (refer to FIG. 4). A front end of the front side region 58aa of the right edge 58a is positioned in a vicinity of a border region between the case side region 41R and the left end side region 55. The left edge 58b of the partitioning wall panel 88 (the partitioning wall 58) is formed as a linear form such that is approximately perpendicular to an axial direction of the left end side region 55 of the right cowl cover portion 52R. The left edge 58b is intermittently joined (sewn) to the vehicle body side wall portion 40a (the vehicle body side panel 85R). Specifically, the left edge 58b is such that a front end side and a rear end side in a flattened state are partially joined (sewn) to the vehicle body side wall portion 40a (the vehicle body side panel 85R) (refer to FIGS. 5 and 6B). The front end side and the rear end side of the left edge 58b are joined (sewn) to the vehicle body side wall portion 40a (the vehicle body side panel 85R) by the lower outer side partial joint portions 61F and 61B. Also, as shown in FIGS. 5 and 6B, the partitioning wall panel 88 (the partitioning wall 58) is joined (sewn) to the vehicle body side wall portion 40a (the vehicle body side panel 85R) in a position slightly to the left side of a left-right center. The partitioning wall panel 88 (the partitioning wall 58) is joined (sewn) to the vehicle body side wall portion 40a (the vehicle body side panel 85R) by the lower inner side partial joint portion 62. The lower inner side partial joint portion 62 is configured as a linear form such that approximately follows the lower outer side partial joint portions 61F and 61B (that is, the left edge 58b of the partitioning wall 58). Also, a length dimension of the lower inner side partial joint portion 62 is a dimension such that the two ends coincide (overlap) one each with left-right direction sides of the lower outer side partial joint portions 61F and 61B in a state wherein the right airbag 40R is flattened (refer to FIG. 6B). That is, the lower inner side partial joint portion 62 is of a configuration such as to block off a gap between the lower outer side partial joint portions 61F and 61B over a whole length in an interior separated on left-right direction sides.

Further, the right airbag 40R of the embodiment is such that the inflating gas G that has flowed into the general expanding portion 54 of the right cowl cover portion 52R via the case side region 41R flows into the left end side region 55 through a gap between the lower inner side partial joint portion 62 and the lower outer side partial joint portions 61F and 61B (refer to FIG. 7A). Specifically, as shown in FIG. 6B, the inflating gas G that has flowed into the general expanding portion 54 flows into the left end side region 55 by deviating approximately following the lower inner side partial joint portion 62 and the lower outer side partial joint portions 61F and 61B. Further, when the left end side region 55 expands owing to inflating gas being caused to flow into the interior, a region of the partitioning wall 58 configuring a periphery of the lower inner side partial joint portion 62 and the lower outer side partial joint portions 61F and 61B is pressed to the vehicle body side wall portion 40a side owing to an internal pressure of the inflating gas G that has flowed into the left end side region 55, attaining a blocked aspect (refer to FIG. 7B). Further, a reverse flow of the inflating gas G to the general expanding portion 54 side is restricted. By an outflow of the inflating gas G to the general expanding portion 54 side being restricted in this way, the internal pressure of the left end side region 55 after inflation is completed is maintained in a high state.

Figure 13:
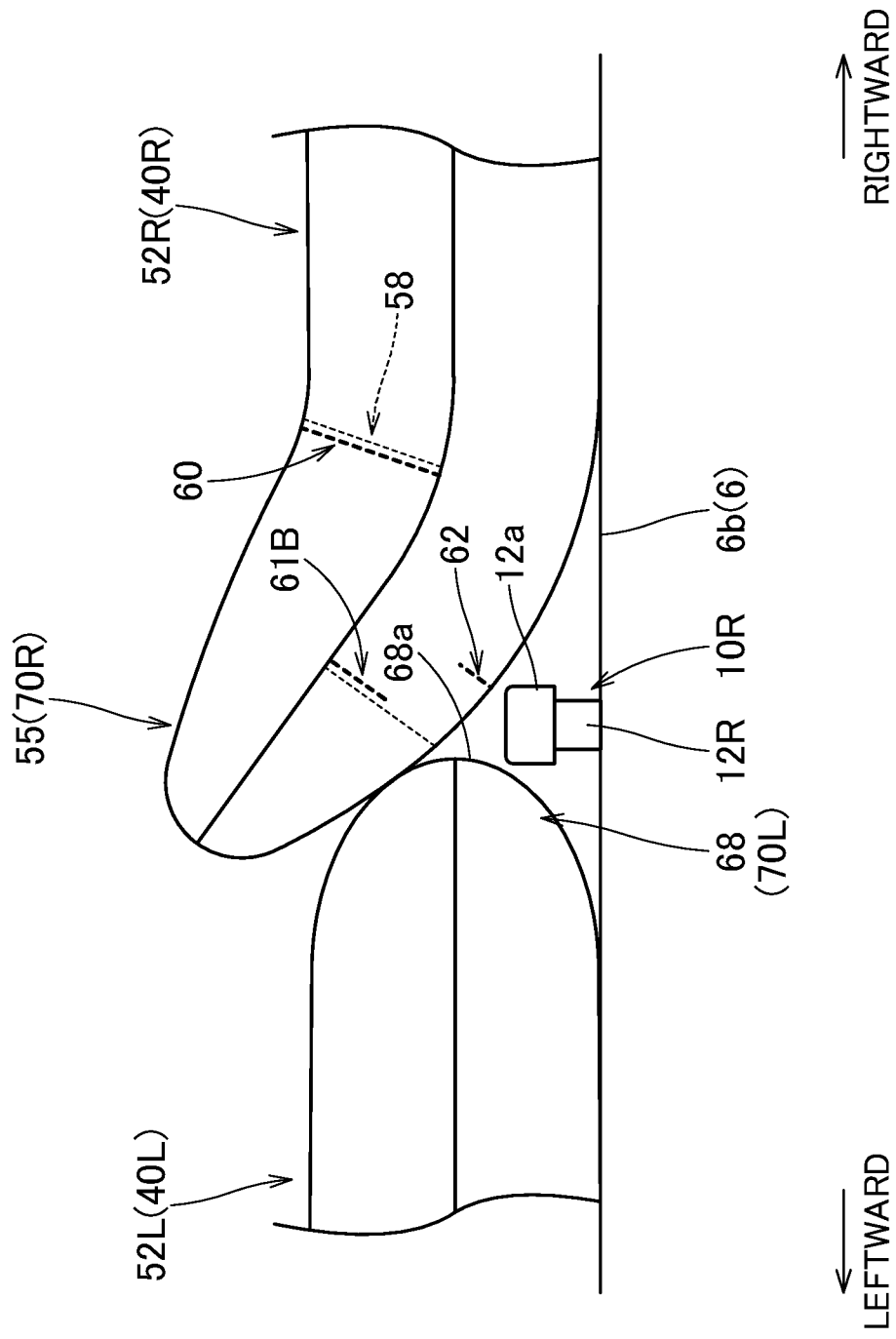
FIG. 13 is a schematic view showing a region of end side regions that coincide with each other when inflation of the left airbag and the right airbag is completed in the pedestrian protection device of the embodiment.

When inflation of the right airbag 40R is completed, the partitioning wall 58 is disposed inclined with respect to the vehicle body side wall portion 40a and the pedestrian side wall portion 40b (with respect to the up-down direction). Also, when inflation of the right airbag 40R is completed, the left end side region 55 is disposed slightly inclined in such a way that the end edge 55a side is slightly lifted up, with the upper side joint region 60 joining the partitioning wall 58 to the pedestrian side wall portion 40b side as an origin (refer to FIG. 7B). Further, the left end side region 55 of the right cowl cover portion 52R configures an end portion region 70R. When inflation of the right airbag 40R and the left airbag 40L is completed, the end portion region 70R is disposed in such a way as to coincide (overlap) with an upper side of a right end side region 68 (an end portion region 70L) of the left cowl cover portion 52L in the left airbag 40L, in a state wherein an internal pressure is raised higher than that of the general expanding portion 54 (refer to FIGS. 11 and 13).

Figure 8:
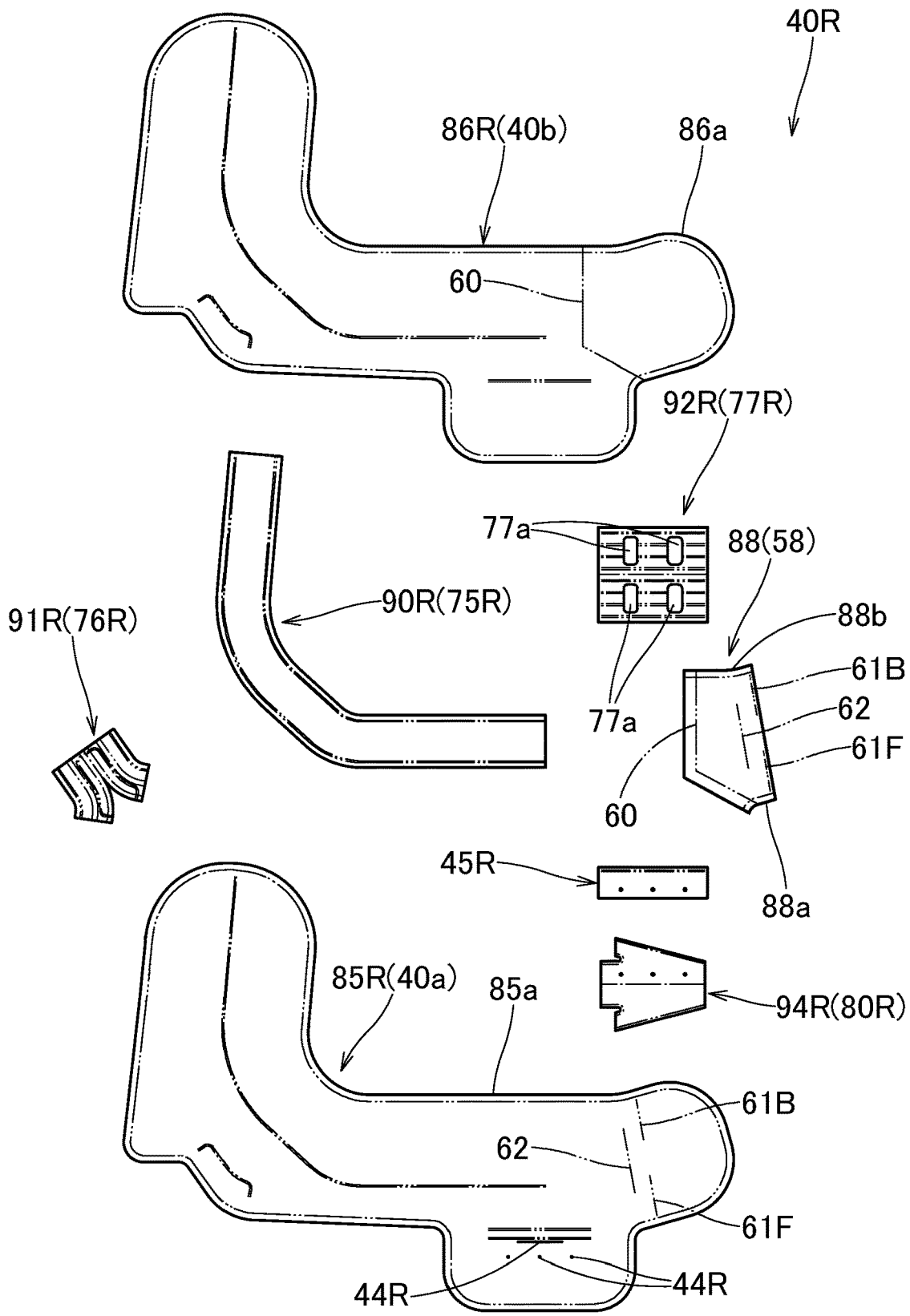
FIG. 8 is a plan view wherein base members configuring the right airbag of FIG. 4 are arrayed.

Also, in the embodiment, tethers 75R, 76R, and 77R are disposed in the interior of the right airbag 40R (refer to FIGS. 4, 5, and 8). The tethers 75R, 76R, and 77R link the pedestrian side wall portion 40b and the vehicle body side wall portion 40a, and regulate a thickness of the right airbag 40R when inflation is completed. The tether 75R is disposed over approximately a whole region from the general expanding portion 54 of the right cowl cover portion 52R to the pillar cover portion 51R. Specifically, the tether 75R is disposed continuously in a position that is approximately central in a width direction from the general expanding portion 54 to the pillar cover portion 51R. The tether 76R is partially disposed on a front edge side in a vicinity of a boundary region between the right cowl cover portion 52R and the pillar cover portion 51R. The tether 77R is disposed in a vicinity of a boundary region between the case side region 41R and the right cowl cover portion 52R (the main body expanding portion 50R). The tether 77R is disposed approximately following the left-right direction in such a way as to partially block off the boundary region. Also, a multiple (two in the case of the embodiment) of apertures 77a formed in an approximately rectangular form are arranged in parallel on left-right direction sides in the tether 77R (refer to FIG. 8). A length dimension of the tether 77R is set to be smaller than a width dimension between left-right direction sides of the case side region 41R in a flattened state. Inflating gas that has flowed into the case side region 41R flows into the main body expanding portion 50R from a gap formed on both end sides of the tether 77R and the two apertures 77a and 77a.

The inner tube 80R that covers the outer peripheral side of the inflator 28R is configured as indicated by two-dot chain lines in FIG. 5. The inner tube 80R has an insertion tube portion 80c in which the inflator 28R to which the attachment bracket 31R has been attached is inserted. Also, the inner tube 80R has a region that extends to both sides from a disposition region of the gas discharging portion 29R in the insertion tube portion 80c, and is of an approximate three-way tubular form. Outflow ports 80a and 80b for causing inflating gas to flow out are disposed on a leading end side of this region. Three attachment holes (reference sign omitted) through which the bolts 32R of each attachment bracket 31R inserted are formed in the insertion tube portion 80c. The inner tube 80R is configured of a tube base member 94R such as that shown in FIG. 8.

As shown in FIG. 8, the right airbag 40R of the embodiment is configured of the vehicle body side panel 85R, which configures the vehicle body side wall portion 40a, the pedestrian side panel 86R, which configures the pedestrian side wall portion 40b; the partitioning wall panel 88 configuring the partitioning wall 58; tether base members 90R, 91R, and 92R configuring the tethers 75R, 76R, and 77R respectively; and the tube base member 94R configuring the inner tube 80R. These base members are configured of a coated fabric wherein a gas leak-preventing coating agent is applied to a surface of a woven fabric formed by weaving a polyamide-based material, a polyester-based material, or the like, and are formed by the coated fabric being cut into a predetermined form.

Figure 9:
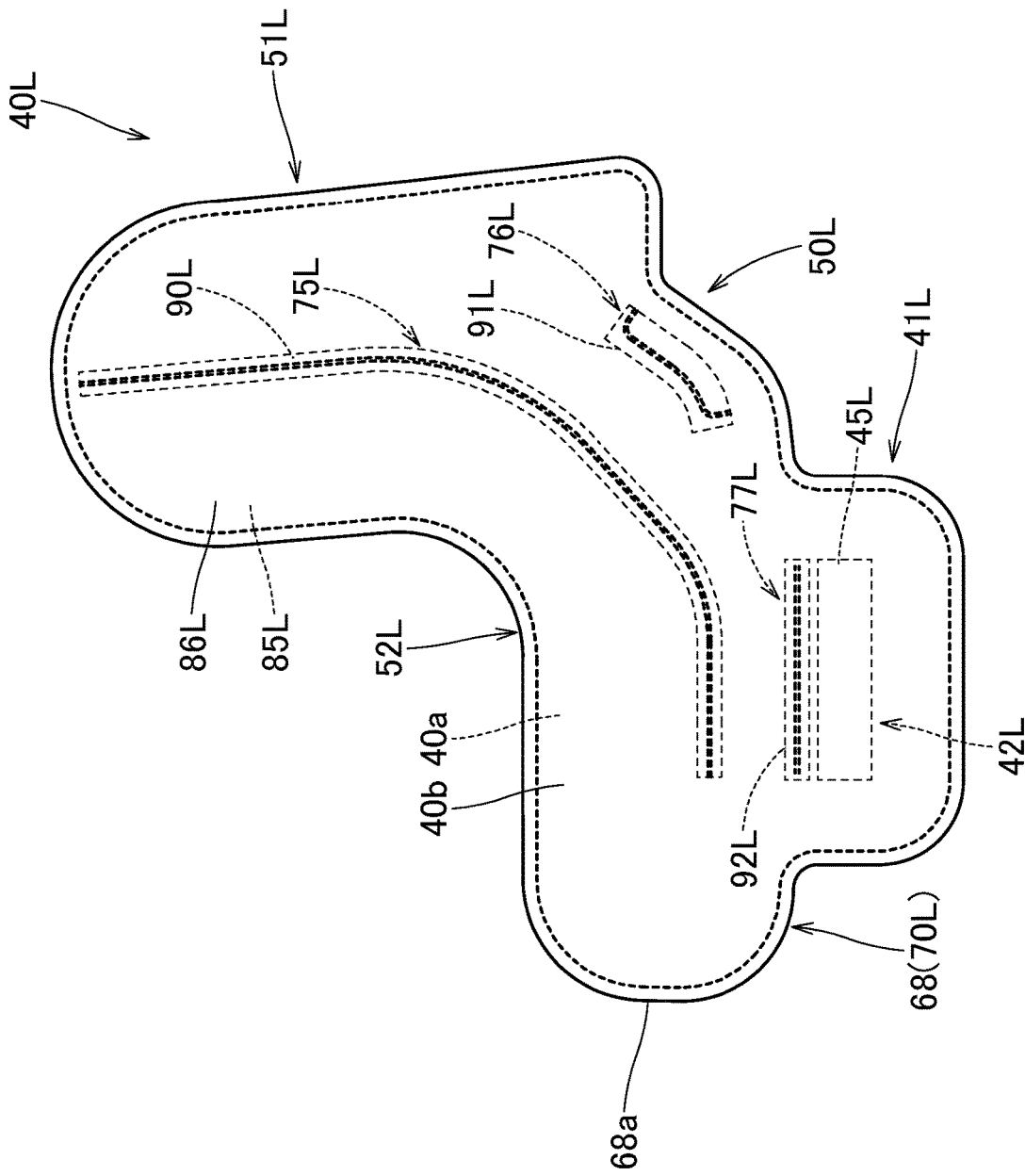
FIG. 9 is a plan view of a state wherein a left airbag used in a left airbag device is flattened.
Figure 11:
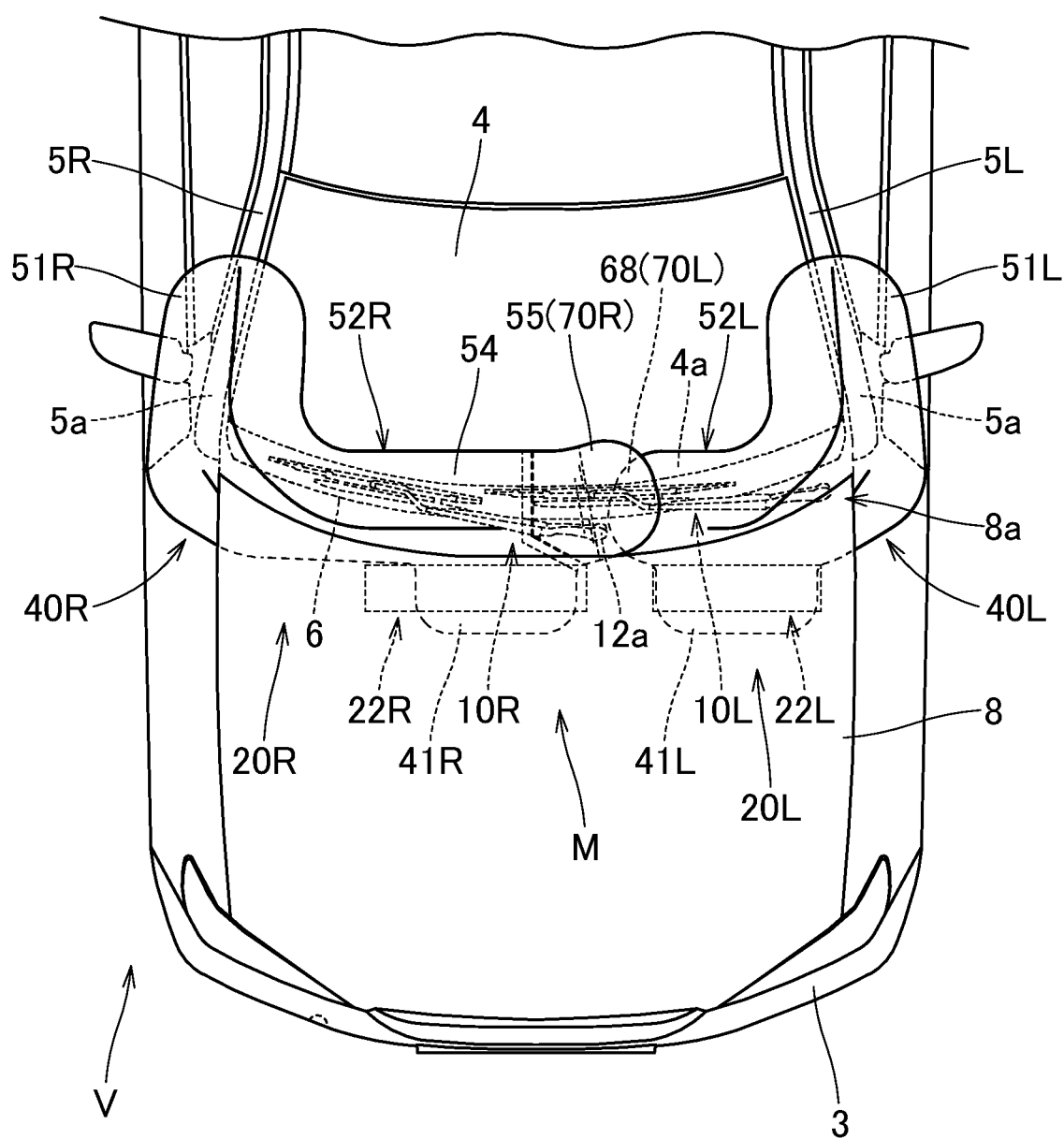
FIG. 11 is a plan view of a vehicle showing a state wherein inflation of the left airbag and the right airbag is completed in the pedestrian protection device of the embodiment.
Figure 12:
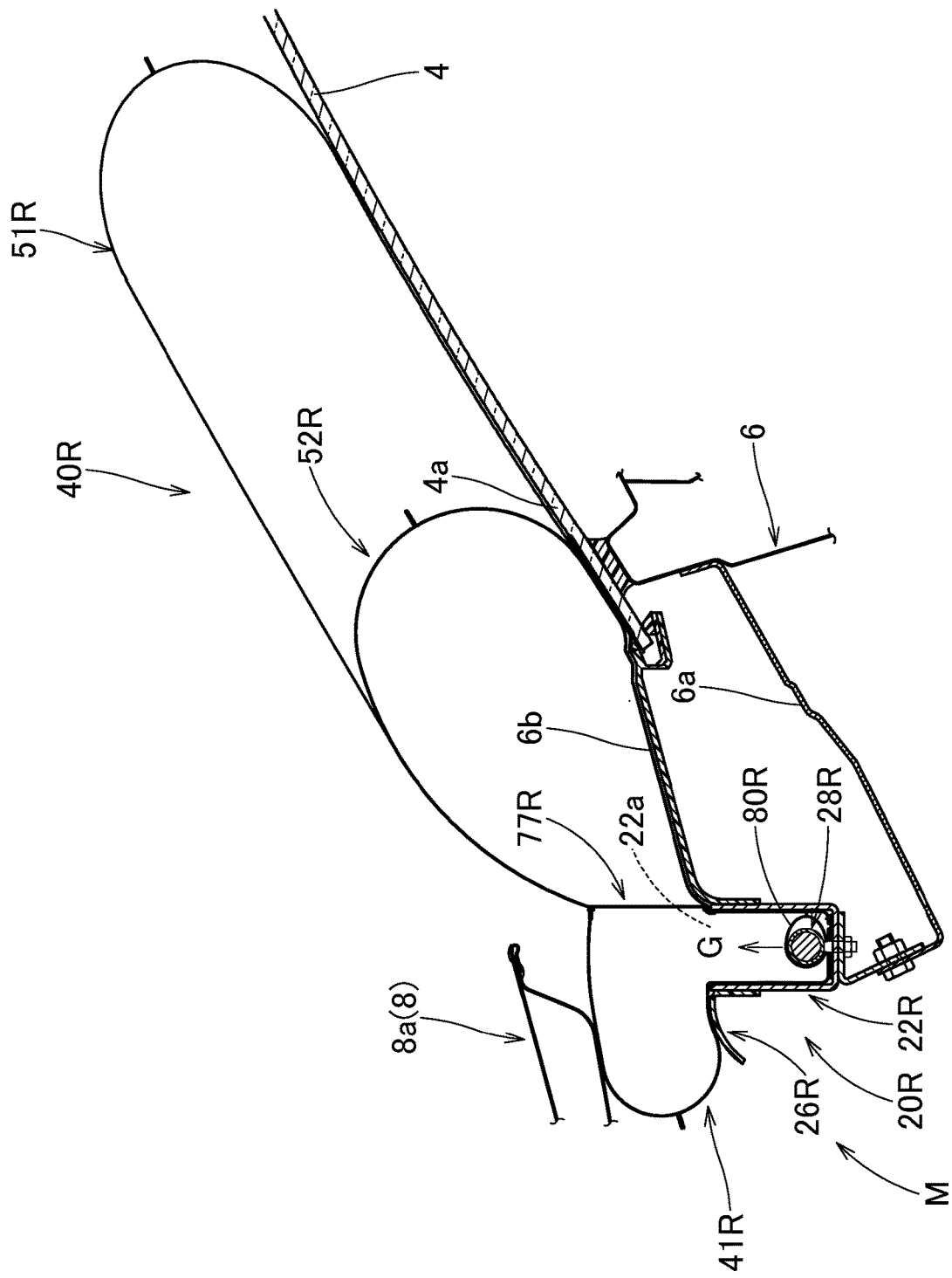
FIG. 12 is a schematic vertical sectional view showing a state wherein inflation of the right airbag is completed in the pedestrian protection device of the embodiment.

As shown in FIG. 11, the left cowl cover portion 52L in the left airbag 40L is of a configuration that covers a region from a left end of the cowl 6 to the left of the wiper pivot 12R of the wiper 10R on the right side when inflation of the left airbag 40L is completed. As shown in FIG. 9, the left cowl cover portion 52L has a region that extends farther to the right than the case side region 41L. The right end side region 68 positioned farther to the right than the case side region 41L is configured in such a way that an end edge 68a (a right edge) is caused to neighbor the wiper pivot 12R when inflation is completed (refer to FIGS. 11 and 13). The partitioning wall 58 disposed in the right cowl cover portion 52R of the right airbag 40R is not disposed in the left cowl cover portion 52L of the left airbag 40L. The right end side region 68 of the left cowl cover portion 52L configures the end portion region 70L. The end portion region 70L is disposed in such a way as to coincide (overlap) with a lower side of the left end side region 55 (the end portion region 70R) of the right cowl cover portion 52R of the right airbag 40R when inflation of the right airbag 40R and the left airbag 40L is completed (refer to FIG. 13). Specifically, in the pedestrian protection device M of the embodiment, an amount by which the end portion regions 70L and 70R coincide with each other (an overlapping amount), when inflation of the left airbag 40L and the right airbag 40R is completed, is set to be in the region of 100 to 180 mm. An amount by which the left cowl cover portion 52L protrudes from the case side region 41L (a width dimension between left-right direction sides of the right end side region 68) is set to be smaller than an amount by which the right cowl cover portion 52R protrudes from the case side region 41R (a width dimension between left-right direction sides of the left end side region 55). Also, in the embodiment, the right airbag device 20R, which is on the passenger seat side, is mounted in a position that is to the right of the wiper pivot 12R on the right side, in an approximate center in the vehicle width direction of the vehicle V. Further, the left airbag device 20L, which is on the driver's seat side, is of a configuration mounted in a position that is between the wiper pivots 12L and 12R, significantly farther to the left end side than the center in the vehicle width direction of the vehicle V. Because of this, in response to these kinds of mounting position, the lengths of the left cowl cover portion 52L of the left airbag 40L and the right cowl cover portion 52R of the right airbag 40R differ (refer to FIGS. 4 and 9). Further, the left airbag 40L is of a smaller capacity than the right airbag 40R by an amount commensurate with this kind of difference in length dimensions between the cowl cover portions 52L and 52R.

Figure 10:
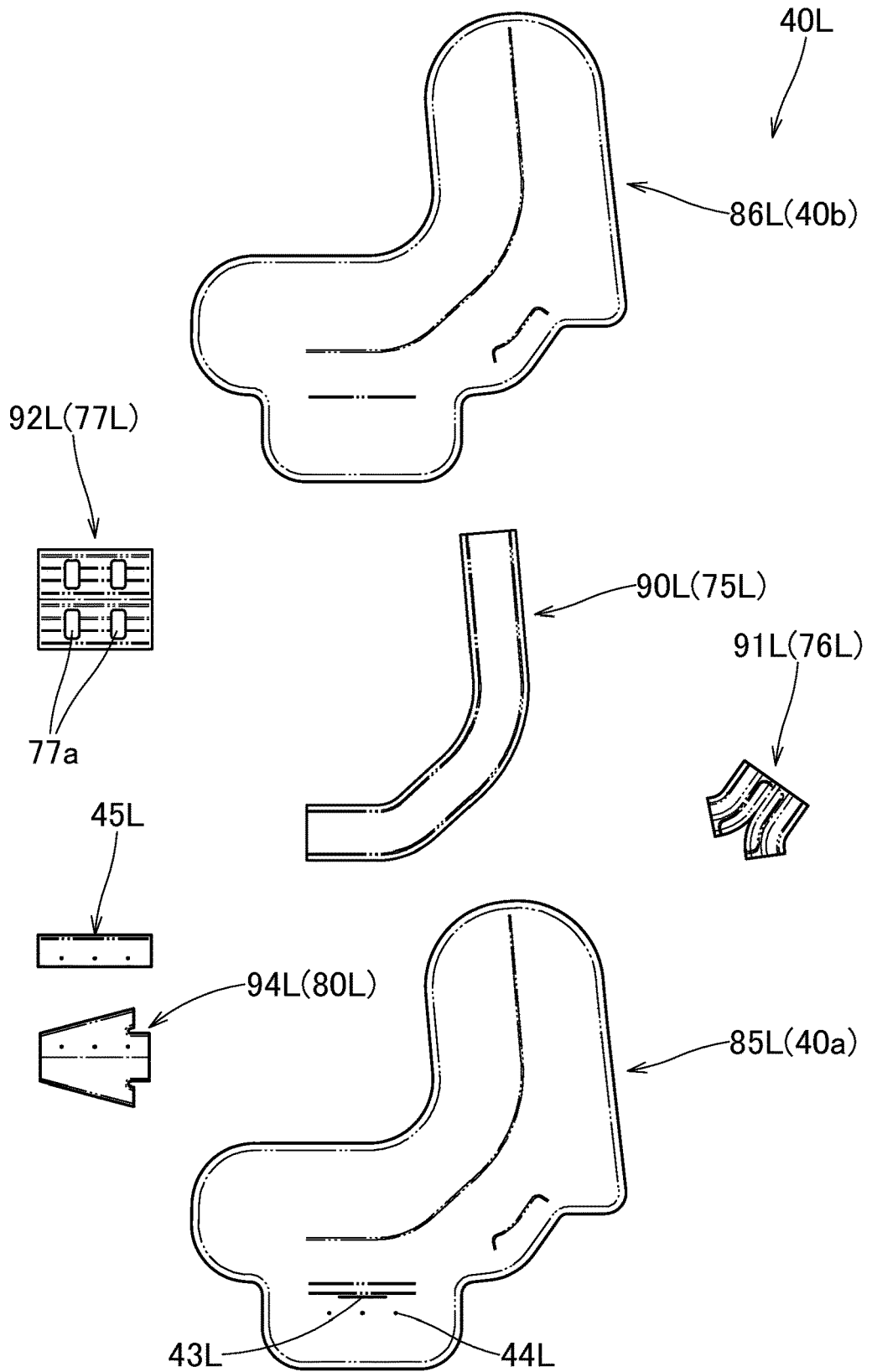
FIG. 10 is a plan view wherein base members configuring the left airbag of FIG. 9 are arrayed.

As shown in FIG. 10, the left airbag 40L, in the same way as the right airbag 40R, is configured of a vehicle body side panel 85L configuring the vehicle body side wall portion 40a, a pedestrian side panel 86L configuring the pedestrian side wall portion 40b, tether base members 90L, 91L, and 92L configuring tethers 75L, 76L, and 77L respectively, and a tube base member 94L configuring an inner tube 80L.

A mounting of the pedestrian protection device M of the embodiment in the vehicle V will be described. Firstly, the right airbag 40R is folded in such a way that the right airbag 40R can be housed in the case 22R. The inflator 28R to which the attachment brackets 31R have been attached is inserted into the right airbag 40R, utilizing the insertion slit 43R, in a state inserted into the inner tube 80R. Further, the bolt 32R of each attachment bracket 31R protruding from an attachment hole (reference sign omitted) of the inner tube 80R is caused to protrude from the insertion hole 44R of the right airbag 40R. Next, the cover panel 45R is closed in such a way as to cover the insertion slit 43R, and the bolt 32R is inserted through the attachment hole 45a. Subsequently, the right airbag 40R and the inflator 28R are housed in the case 22R. The right airbag device 20R is assembled by attaching the airbag cover 26R to the case 22R. Next, the case 22R is disposed in a predetermined position in the vehicle V. The bolts 32R protruding from the case 22R are fastened to the attachment portion 2R using the nuts 33R. The right airbag device 20R can be mounted in the vehicle V by connecting the inflator 28R to an unshown operation circuit. By assembling the left airbag device 20L and mounting the left airbag device 20L in the vehicle V in the same way, the pedestrian protection device M can be mounted in the vehicle V.

The pedestrian protection device M of the embodiment is such that when an unshown operation circuit detects a collision between the vehicle V and a pedestrian based on an operation signal from an unshown sensor disposed in the front bumper 3, each inflator 28L and 28R is operated. Further, the right airbag 40R and the left airbag 40L expand owing to inflating gas being caused to flow into the interior. The right airbag 40R expands in such a way as to cover a region that is roughly a right half of the cowl 6, and the lower portion 5a side of the front face of the front pillar 5R on the right side. The left airbag 40L expands in such a way as to cover a region that is roughly a left half of the cowl 6, and the lower portion 5a side of a front face of a front pillar 5L on the left side (refer to a two-dot chain line in FIG. 1 and to FIG. 11).

Further, the pedestrian protection device M of the embodiment is such that the cowl cover portions 52L and 52R of the left airbag 40L and the right airbag 40R respectively include the end portion regions 70L and 70R, which are caused to coincide (overlap) with each other on up-down direction sides when inflation is completed. Further, at least one of the end portion regions 70L and 70R (in the case of the embodiment, the end portion region 70R formed in the right cowl cover portion 52R of the right airbag 40R) is of a configuration disposed with the internal pressure raised higher than that of a general region (the general expanding portion 54) of the right airbag 40R. That is, the pedestrian protection device M of the embodiment is such that the end portion region 70R, of the coinciding (overlapping) end portion regions of the cowl cover portions 52L and 52R, is of a configuration disposed in a state wherein high internal pressure is maintained. This means that even when an amount by which end portion regions coincide with each other is set to be small in comparison with a case wherein end portion regions coincide with each other with the internal pressure approximately the same in all regions of a cowl cover portion, a high protective performance can be secured. As a result of this, a pedestrian can be stably protected by the end portion regions 70L and 70R. That is, the pedestrian protection device M of the embodiment is such that the amount by which the end portion regions 70L and 70R of the cowl cover portions 52L and 52R respectively coincide with each other can be reduced. In other words, in the case of the embodiment, the length dimension of the right cowl cover portion 52R caused to coincide on the upper side can be relatively small. Because of this, an increase in the capacity of the right airbag 40R can be restricted.

Consequently, the pedestrian protection device M of the embodiment is such that an increase in the capacity of the left airbag 40L or the right airbag 40R (specifically, the right airbag 40R) can be restricted, and a stable protective performance can be secured.

Also, in the pedestrian protection device M of the embodiment, an upper side end portion region positioned on the upper side when inflation is completed (in the case of the embodiment, the end portion region 70R of the right airbag 40R caused to coincide on the upper side) is such that an internal pressure when inflation is completed is raised higher than that of another general region (the general expanding region 54 of the right cowl cover portion 52R). This means that when a pedestrian is received in a vicinity of a boundary region between the cowl cover portions 52L and 52R (the end portion regions 70L and 70R that coincide with each other) when inflation of the left airbag 40L and the right airbag 40R is completed, firstly, a region whose internal pressure is set to be high (the end portion region 70R caused to coincide on the upper side) comes into contact with the pedestrian in a state wherein a lower face side is supported by the end portion region 70L, and receives the pedestrian. That is, a region that expands relatively firmly receives the pedestrian, because of which a reactive force necessary for protection of the pedestrian is more easily secured in comparison with a case wherein a region whose internal pressure is set to be high coincides on a lower side, and the pedestrian can be stably protected. When such a point is not taken into consideration, a configuration may be such that the internal pressure of an end portion region caused to coincide on the lower side is raised. Also, in the embodiment, only an end portion region caused to coincide on the upper side is of a configuration wherein the internal pressure when inflation is completed is set to be high, but of course, both end portion regions may be of a configuration wherein the internal pressure when inflation is completed is raised higher than that of another general region. When a configuration wherein the internal pressure of both end portion regions is raised is adopted, an overlapping amount (a coinciding amount) of the end portion regions can be further reduced.

Furthermore, in the pedestrian protection device M of the embodiment, the left airbag 40L and the right airbag 40R are configured in such a way as to expand on the left and the right respectively of the wiper pivot 12R disposed centrally in the vehicle width direction in the left and right pair of wipers 10L and 10R. Further, the end portion region 70L (the right end side region 68) of the left airbag 40L, which is positioned on the lower side when inflation is completed, is of a configuration such that the end edge 68a is caused to neighbor the wiper pivot 12R. That is, an aspect is such that the wiper pivot 12R is disposed in a recessed region occurring between the end edge 68a of the end portion region 70L (the right end side region 68) on the lower side and the lower face side of the end portion region 70R (the left end side region 55) on the upper side when inflation of the left airbag 40L and the right airbag 40R is completed (refer to FIG. 13). This means that even when adopting a configuration wherein the wiper pivot 12R partially protruding upward from the cowl 6 (specifically, the cowl louver 6b) is covered from above by a vicinity of an end of the right cowl cover portion 52R, that is, the end portion region 70R (the left end side region 55), the end portion region 70R (the left end side region 55) can be restricted from interfering with the wiper pivot 12R, whose upper end 12a side is partially protruding from the cowl louver 6b, and significantly rising up. As a result of this, the wiper pivot 12R can be reliably covered from above by the end portion region 70R (the left end side region 55). Also, the end portion region 70R (the left end side region 55) is of an aspect such that the lower face side is supported by the end portion region 70L (the right end side region 68). In other words, a region that expands thickly in such a way that the end portion region 70R (the left end side region 55) and the end portion region 70L (the right end side region 68) are caused to coincide vertically is caused to neighbor the wiper pivot 12R when inflation of the left airbag 40L and the right airbag 40R is completed. In addition, the end portion region 70R (the left end side region 55), whose internal pressure is set to be high, covers the wiper pivot 12R from above. This means that even when an aspect is such that a pedestrian comes into contact with a region in a vicinity of the wiper pivot 12R when inflation of the left airbag 40L and the right airbag 40R is completed, the contact between the pedestrian and the wiper pivot 12R can be reliably restricted by the end portion region 70R (the left end side region 55), wherein high internal pressure is maintained, and the end portion region 70L (the right end side region 68) supporting the lower face side of the end portion region 70R.

Also, the pedestrian protection device M of the embodiment is such that the left end side region 55 (the end portion region 70R) of the right cowl cover portion 52R of the right airbag 40R is disposed inclined in such a way that the end edge 55a side is slightly lifted up. Because of this, the left end side region 55 (the end side region 70R) rises up easily when the left airbag 40L and the right airbag 40R are expanding, and the left end side region 55 (the end side region 70R) is easily disposed in such a way as to cover the upper side of the right end side region 68 (the end side region 70L).

The pedestrian protection device M of the embodiment is such that the length dimension of the right cowl cover portion 52R of the right airbag 40R disposed on the right side, which is the passenger seat side, is set to be greater than that of the left cowl cover portion 52L of the left airbag 40L disposed on the left side, which is the driver's seat side. Further, the right cowl cover portion 52R is of a configuration such that the partitioning wall 58 is provided in the interior in order that the end portion region 70R expands with a high internal pressure, and the end portion region 70R is caused to coincide on the upper side. Of course, a pedestrian protection device of the invention is not limited to the embodiment. An airbag disposed on a driver's seat side may be of a configuration such that an end portion region of a cowl cover portion is caused to expand with a high internal pressure, and is caused to coincide on an upper side. However, an airbag on the driver's seat side needs to be housed in a case mounted in a region in a gap between wiper pivots of two wipers, and a large mounting space is more difficult to secure in comparison with an airbag on the passenger seat side mounted in a region to a side of a wiper pivot that is central in a vehicle width direction. Because of this, adopting a configuration wherein an airbag including an end portion region of a configuration caused to expand with a high internal pressure is mounted on the passenger seat side, where mounting space can easily be secured, is also preferable as a configuration such that capacity is increased. Of course, a configuration may be such that, as heretofore described, this kind of end portion region with a high internal pressure is provided on not only one airbag side, but in both airbags. Also, in the embodiment, a pedestrian protection device is mounted in a left-hand drive vehicle, but the pedestrian protection device can, of course, be mounted in a right-hand drive vehicle wherein the driver's seat is disposed on the right side. In the case of a right-hand drive vehicle, the left and right wipers are mounted in such a way as to be inverted left and right with respect to a left-hand drive vehicle. Further, when adopting a configuration wherein an end portion region with a high internal pressure is provided in one airbag, adopting a configuration wherein the end portion region with a high internal pressure is provided in an airbag disposed on the left side, which is the passenger seat side, is preferable. Furthermore, the pedestrian protection device of the embodiment is such that the left airbag and the right airbag are of configurations such as to expand owing to inflating gas supplied from separate inflators being caused to flow into the interiors, but a configuration wherein two airbags are caused to expand by inflating gas supplied from one inflator, using a branching gas supply tube or the like, may be adopted.

The present disclosure relates to a pedestrian protection device of the following configuration.

The pedestrian protection device includes:

a left airbag and a right airbag that are disposed in a vicinity of a rear end of a hood panel in a vehicle, and are arranged in parallel on vehicle width direction sides when inflation of each is completed, wherein the left airbag includes a left cowl cover portion that is disposed approximately following the vehicle width direction and covers an upper face side of a cowl when inflation is completed, and the right airbag includes a right cowl cover portion that is disposed approximately following the vehicle width direction and covers the upper face side of the cowl when inflation is completed, and wherein the left cowl cover portion and the right cowl cover portion are configured to have end portion regions disposed coinciding with each other on up-down direction sides on end sides that are in proximity to each other when inflation is completed, and at least one of the end portion regions is configured in such a way that an internal pressure when inflation is completed is raised higher than that of a general region of the left airbag or the right airbag.

In the pedestrian protection device of the present disclosure, at least one of the end portion regions caused to coincide with each other on up-down direction sides in the cowl cover portions of the left airbag and the right airbag is of a configuration disposed with internal pressure raised higher than that of a general region. That is, in the pedestrian protection device of the present disclosure, at least one of the end portion regions coinciding in the cowl cover portions is of a configuration disposed in a state wherein a high internal pressure is maintained. This means that even when an amount by which end portion regions coincide with each other is set to be small in comparison with a case wherein end portion regions coincide with each other with the internal pressure approximately the same in all regions of a cowl cover portion, a high protective performance can be secured. As a result of this, a pedestrian can be stably protected by the end portion regions coinciding vertically. That is, the pedestrian protection device of the present disclosure is such that the amount by which the end portion regions of the cowl cover portions coincide with each other can be reduced. In other words, the length dimension of the cowl cover portion can be relatively small. Because of this, an increase in the capacity of the left airbag or the right airbag can be restricted.

Consequently, the pedestrian protection device of the present disclosure is such that an increase in the capacity of the left airbag or the right airbag can be restricted, and a stable protective performance can be secured.

Also, the pedestrian protection device of the present disclosure is such that an upper side end portion region positioned on the upper side when inflation is completed is preferably such that an internal pressure when inflation is completed is raised higher than that of another general region. Adopting this kind of configuration means that when a pedestrian is received in a vicinity of a boundary region between the cowl cover portions (the end portion regions that coincide with each other) when inflation of the left airbag and the right airbag is completed, firstly, a region whose internal pressure is set to be high (the upper side end portion region) comes into contact with the pedestrian in a state wherein a lower face side is supported by the lower side end portion region, and receives the pedestrian. That is, a region that expands relatively firmly receives the pedestrian. Because of this, a reactive force necessary for protection of the pedestrian is more easily secured in comparison with a case wherein a region whose internal pressure is set to be high coincides on the lower side, and the pedestrian can be stably protected.

Furthermore, the pedestrian protection device of the heretofore described configuration is such that the left airbag and the right airbag are of configurations that expand on the left and the right respectively of a wiper pivot disposed centrally in the vehicle width direction in a left and right pair of wipers, and the lower side end portion region positioned on the lower side when inflation is completed is preferably of a configuration wherein an end edge is caused to neighbor the wiper pivot.

When adopting the heretofore described configuration for the pedestrian protection device, an aspect is such that the wiper pivot is disposed in a recessed region occurring between the end edge of the lower side end portion region and the lower face side of the upper side end portion region in a region where the lower side end portion region and the upper side end portion region vertically overlap when inflation of the left airbag and the right airbag is completed. This means that even when adopting a configuration wherein the wiper pivot partially protruding upward from the cowl is covered from above by a vicinity of an end of the cowl cover portion, that is, the end portion region, in the expanded left airbag or right airbag, a region (the end portion region) on the end side of the cowl cover portion in the left airbag or the right airbag can be restricted from interfering with the wiper pivot and significantly rising up. As a result of this, the wiper pivot can be reliably covered from above by the upper side end portion region. Also, the upper side end portion region is of an aspect such that the lower face side is supported by the lower side end portion region. In other words, a region that expands thickly in such a way that the upper side end portion region and the lower side end portion region are caused to coincide vertically is caused to neighbor the wiper pivot when inflation of the left airbag and the right airbag is completed. In addition, the upper side end portion region, whose internal pressure is set to be high, covers the wiper pivot from above. This means that even when an aspect is such that a pedestrian comes into contact with a region in a vicinity of the wiper pivot when inflation of the left airbag and the right airbag is completed, the contact between the pedestrian and the wiper pivot can be reliably restricted by the upper side end portion region, wherein high internal pressure is maintained, and the lower side end portion region supporting the lower face side of the upper side end portion region.

What is claimed is:

1. A pedestrian protection device, comprising
a left airbag and a right airbag that are disposed in a vicinity of a rear end of a hood panel in a vehicle, and are arranged in parallel on vehicle width direction sides when inflation of each is completed, wherein
the left airbag includes a left cowl cover portion that is disposed approximately following the vehicle width direction and covers an upper face side of a cowl when inflation is completed, and
the right airbag includes a right cowl cover portion that is disposed approximately following the vehicle width direction and covers the upper face side of the cowl when inflation is completed, and wherein
the left cowl cover portion and the right cowl cover portion are configured to have end portion regions disposed coinciding with each other on up-down direction sides on end sides that are in proximity to each other when inflation is completed, and
at least one of the end portion regions is configured in such a way that an internal pressure when inflation is completed is raised higher than that of a general region of the left airbag or the right airbag.

2. The pedestrian protection device according to claim 1, wherein
an upper side end portion region positioned on an upper side when inflation is completed is configured in such a way that an internal pressure when inflation is completed is raised higher than that of another general region.

3. The pedestrian protection device according to claim 2, wherein
the left airbag and the right airbag are configured in such a way as to expand on a left and a right respectively of a wiper pivot disposed centrally in the vehicle width direction in a left and right pair of wipers, and
a lower side end portion region positioned on a lower side when inflation is completed is configured in such a way that an end edge is caused to neighbor the wiper pivot.

4. The pedestrian protection device according to claim 3, wherein
the upper side end portion region is of a configuration disposed inclined in such a way that an end edge is lifted upward.

5. The pedestrian protection device according to claim 2, wherein
a wall that separates the upper side end portion region and the general region is disposed in the left cowl cover portion or the right cowl cover portion.

* * * * *